US012281729B2

United States Patent
Nagahara et al.

(10) Patent No.: US 12,281,729 B2
(45) Date of Patent: Apr. 22, 2025

(54) TUBE ASSEMBLY, COMPRESSOR, REFRIGERATION APPARATUS, AND METHOD OF MANUFACTURING TUBE ASSEMBLY

(71) Applicant: DAIKIN INDUSTRIES, LTD., Osaka (JP)

(72) Inventors: Kenji Nagahara, Osaka (JP); Yoshitomo Tsuka, Osaka (JP); Tetsuya Nagamichi, Osaka (JP); Kousuke Araki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/674,895

(22) Filed: May 27, 2024

(65) Prior Publication Data

US 2024/0309975 A1  Sep. 19, 2024

Related U.S. Application Data

(63) Continuation of application No. PCT/JP2022/044556, filed on Dec. 2, 2022.

(30) Foreign Application Priority Data

Dec. 10, 2021 (JP) .................... 2021-200734
May 27, 2022 (JP) .................... 2022-086943

(51) Int. Cl.
*F16L 13/08* (2006.01)
*F25B 41/40* (2021.01)

(52) U.S. Cl.
CPC ............. *F16L 13/08* (2013.01); *F25B 41/40* (2021.01)

(58) Field of Classification Search
CPC .................... F16L 13/08; F25B 41/40
See application file for complete search history.

(56) References Cited

U.S. PATENT DOCUMENTS 4,432,411 A * 2/1984 Hooper ............... H02K 55/04
  165/47
5,704,423 A * 1/1998 Letrange ............ F28F 1/022
  165/906

(Continued)

FOREIGN PATENT DOCUMENTS

CN 106052443 A 10/2016
JP 58-127281 U 8/1983

(Continued)

OTHER PUBLICATIONS

International Search Report of corresponding PCT Application No. PCT/JP2022/044556 dated Jan. 10, 2023.

(Continued)

*Primary Examiner* — David R Deal
(74) *Attorney, Agent, or Firm* — GLOBAL IP COUNSELORS, LLP

(57) ABSTRACT

A tube assembly includes inner and outer tubes, and a brazing material. The inner tube has an outer peripheral surface first portion and an outer peripheral surface second portion. The outer tube has an inner peripheral surface first portion and an inner peripheral surface second portion. The inner and outer tubes form a refrigerant passage of a compressor. The inner peripheral surface first portion is located adjacent an end of the outer tube. The inner peripheral surface second portion is located spaced from the end as compared with the inner peripheral surface first portion. The outer peripheral surface first portion is press-fitted into the inner peripheral surface first portion. The brazing material is disposed in a brazing gap between the outer peripheral surface second portion and the inner peripheral surface (Continued)

second portion. The brazing material fixes the outer peripheral surface second portion and the inner peripheral surface second portion.

18 Claims, 9 Drawing Sheets

(56) References Cited

U.S. PATENT DOCUMENTS

| | | | | |
|---|---|---|---|---|
| 6,230,747 | B1* | 5/2001 | Nakao | F16L 13/08 285/289.5 |
| 2003/0192335 | A1* | 10/2003 | Rembold | F25B 41/40 62/298 |
| 2010/0107682 | A1* | 5/2010 | Cartheuser | F25B 41/40 428/603 |
| 2011/0138886 | A1* | 6/2011 | McDonald | F25B 41/40 73/46 |
| 2011/0220237 | A1* | 9/2011 | Okamoto | B21D 39/04 138/140 |
| 2013/0319569 | A1* | 12/2013 | Kikuno | B23K 1/002 138/109 |
| 2014/0016995 | A1* | 1/2014 | Wilson | F16L 13/007 156/60 |
| 2017/0114932 | A1* | 4/2017 | Nakajima | F28F 9/182 |
| 2019/0316589 | A1 | 10/2019 | Endou et al. | |
| 2021/0302079 | A1* | 9/2021 | Bryant | F16L 13/103 |

FOREIGN PATENT DOCUMENTS

| | | |
|---|---|---|
| JP | 59-18189 U | 2/1984 |
| JP | 59-133972 U | 8/1984 |
| JP | 60-15066 A | 1/1985 |
| JP | 5-93592 A | 4/1993 |
| JP | 9-253839 A | 9/1997 |
| JP | 2001-87853 A | 4/2001 |
| JP | 2002-66730 A | 3/2002 |
| JP | 2012-206147 A | 10/2012 |
| JP | 2018-17233 A | 2/2018 |
| JP | 2020-109297 A | 7/2020 |
| JP | 2021-13952 A | 2/2021 |

OTHER PUBLICATIONS

International Preliminary Report of corresponding PCT Application No. PCT/JP2022/044556 dated Jun. 20, 2024.

European Search Report of corresponding EP Application No. 22 825 073.4 dated Dec. 16, 2024.

* cited by examiner

TUBE ASSEMBLY, COMPRESSOR, REFRIGERATION APPARATUS, AND METHOD OF MANUFACTURING TUBE ASSEMBLY

CROSS-REFERENCE TO RELATED APPLICATIONS

This is a continuation of International Application No. PCT/JP2022/044556 filed on Dec. 2, 2022, which claims priority to Japanese Patent Application Nos. 2021-200734, filed on Dec. 10, 2021 and 2022-086943, filed on May 27, 2022. The entire disclosures of these applications are incorporated by reference herein.

BACKGROUND

Technical Field

The present disclosure relates to a tube assembly. The present disclosure further relates to a compressor including a tube assembly and a refrigeration apparatus including a tube assembly. The present disclosure further relates to a method of manufacturing a tube assembly.

Background Art

A refrigerant flow path member disclosed in Patent Literature 1 (JP 2020-109297 A) guides a refrigerant, and is mounted on a compressor. The refrigerant flow path member includes two metal members. At the time of manufacturing the refrigerant flow path member, the two metal members are joined to each other by a method such as in-furnace brazing.

SUMMARY

A tube assembly according to the present disclosure includes an inner tube, an outer tube, and a brazing material. The inner tube includes an outer peripheral surface first portion and an outer peripheral surface second portion. The inner tube constitutes an injection path of a compressor. The outer tube includes an inner peripheral surface first portion and an inner peripheral surface second portion. The outer tube constitutes the injection path. The inner tube is partially inserted into the outer tube such that the outer peripheral surface first portion is in contact with the inner peripheral surface first portion. The brazing material is disposed in a brazing gap between the outer peripheral surface second portion and the inner peripheral surface second portion. The brazing material fixes the outer peripheral surface second portion and the inner peripheral surface second portion.

In this configuration, the outer peripheral surface first portion is in contact with the inner peripheral surface first portion. Accordingly, since the inner tube and the outer tube hold each other, the brazing gap can be maintained, and the overall shape and strength of the tube assembly can be maintained.

DETAILED DESCRIPTION OF EMBODIMENT(S)

Basic Embodiment (1) Overall Configuration

Figure 1:
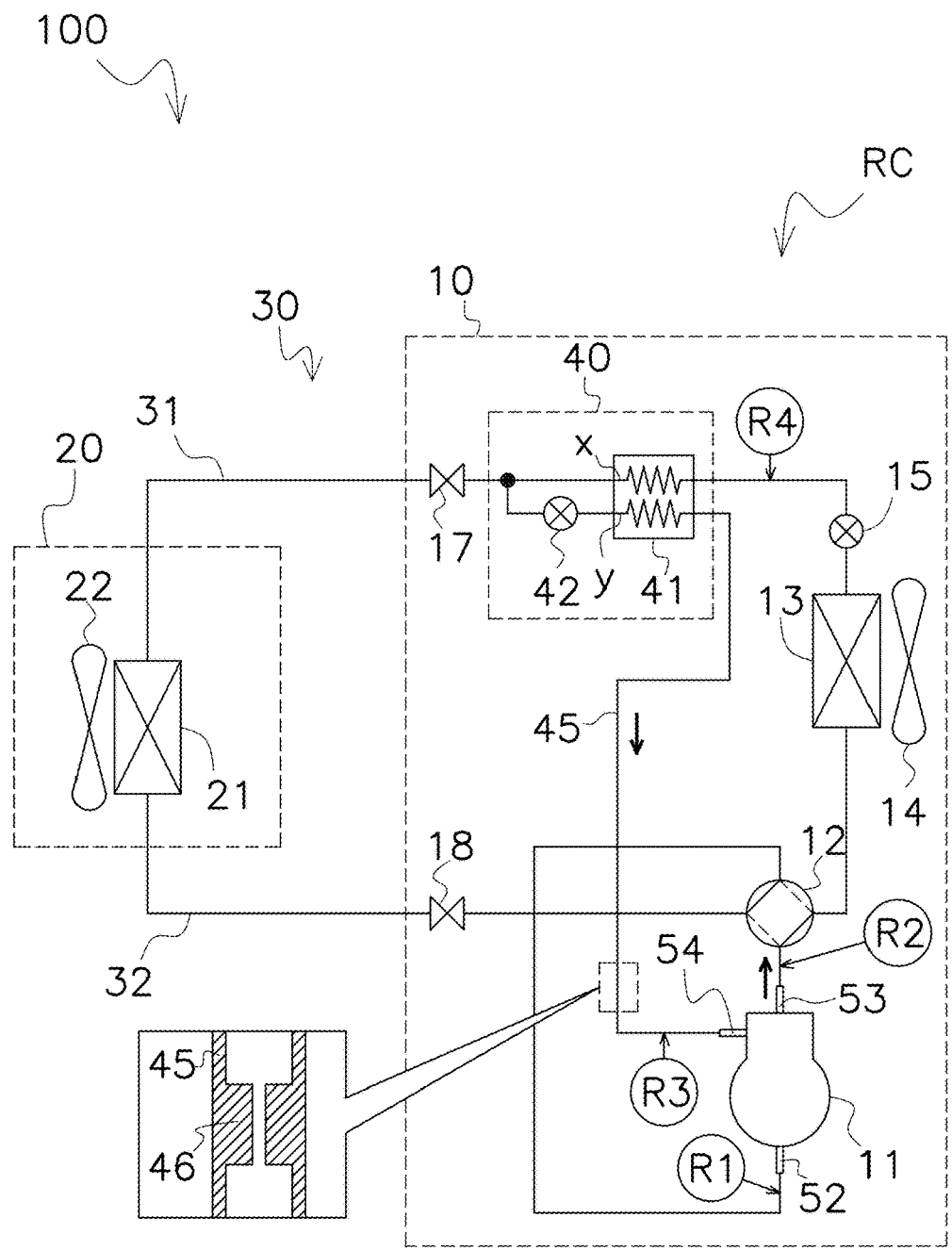
FIG. 1 is a schematic diagram of a refrigeration apparatus 100.

FIG. 1 shows a refrigeration apparatus 100. The refrigeration apparatus 100 acquires cold or heat from a heat source and provides the cold or heat to a user. A specific form of the refrigeration apparatus 100 is, for example, an air conditioner, a refrigerator, a freezer, a water heater, a floor heater, or a washing and drying machine.

The refrigeration apparatus 100 includes a refrigerant circuit RC that circulates a refrigerant. The refrigerant circuit RC includes one heat source unit 10, one utilization unit 20, and a connection pipe 30. Alternatively, one refrigeration apparatus 100 may include a plurality of heat source units 10 and a plurality of utilization units 20.

(1-1) Heat Source Unit 10

The heat source unit 10 acquires cold or heat from air as a heat source. The heat source unit 10 includes a compressor 11, a four-way switching valve 12, a heat source heat exchanger 13, a heat source fan 14, a heat source expansion valve 15, a liquid shutoff valve 17, and a gas shutoff valve 18. The heat source unit 10 further includes an intermediate-pressure refrigerant generator 40 and an injection pipe 45.

The compressor 11 suctions and compresses a low-pressure refrigerant R1 and discharges a high-pressure refrigerant R2 in a direction of an arrow in the drawing. The four-way switching valve 12 achieves a connection indicated by the solid lines in FIG. 1 during a cold providing operation, and achieves a connection indicated by the broken lines in FIG. 1 during a heat providing operation. The heat source heat exchanger 13 functions as a condenser or a heat radiator during the cold providing operation, and functions as an evaporator or a heat absorber during the heat providing operation. The heat source fan 14 promotes heat exchange between the air and the refrigerant performed in the heat source heat exchanger 13. The heat source expansion valve 15 functions as a decompressor for decompressing the refrigerant. Furthermore, the heat source expansion valve 15 adjusts a circulation amount of the refrigerant. The liquid shutoff valve 17 and the gas shutoff valve 18 shut off the refrigerant circuit RC when the refrigeration apparatus 100 is installed or the like.

The intermediate-pressure refrigerant generator 40 includes a subcooling heat exchanger 41 and a subcooling valve 42. The subcooling heat exchanger 41 includes a first flow path x and a second flow path y. During the cold providing operation, a decompressed refrigerant R4 decompressed by the heat source expansion valve 15 passes through the first flow path x. The cooling gas passing through the second flow path y applies a degree of subcooling to the decompressed refrigerant R4 by cooling the decompressed refrigerant R4 passing through the first flow path x. The subcooling valve 42 generates a cooling gas by decompressing the decompressed refrigerant R4 that has passed through the first flow path x. After passing through the second flow path y, the cooling gas passes through the injection pipe 45 as an intermediate-pressure refrigerant R3, and is then guided to an injection path 54 described later included in the compressor 11. The injection pipe 45 includes a bottleneck 46 having a flow path sectional area smaller than other parts.

(1-2) Utilization Unit 20

The utilization unit 20 provides cold or heat to the user. The utilization unit 20 includes a utilization heat exchanger 21 and a utilization fan 22. The utilization heat exchanger 21 functions as an evaporator or a heat absorber during the cold providing operation, and functions as a condenser or a heat radiator during the heat providing operation. The utilization fan 22 promotes heat exchange between the air and the refrigerant performed in the utilization heat exchanger 21.

(1-3) Connection Pipe 30

The connection pipe 30 constitutes the refrigerant circuit RC through which the refrigerant circulates by connecting the heat source unit 10 and the utilization unit 20. The connection pipe 30 includes a liquid connection pipe 31 and a gas connection pipe 32. The liquid connection pipe 31 is connected to the liquid shutoff valve 17 and guides a liquid refrigerant or a gas-liquid two-phase refrigerant. The gas connection pipe 32 is connected to the gas shutoff valve 18 and guides the low-pressure refrigerant R1 or the high-pressure refrigerant R2 in a gaseous state.

(2) Configuration of Compressor 11

Figure 2:
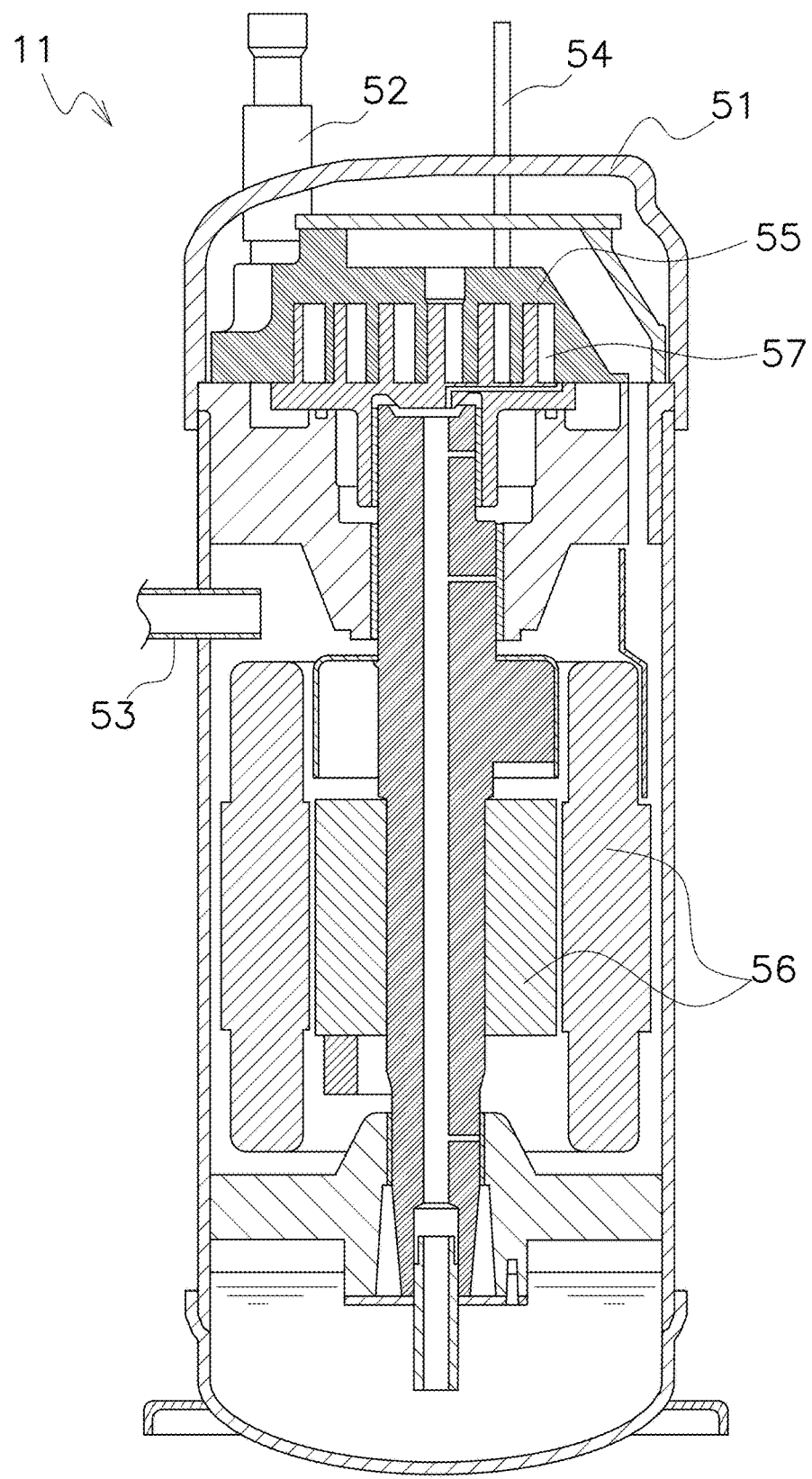
FIG. 2 is a schematic diagram of a compressor 11.

FIG. 2 shows the compressor 11. The compressor 11 includes a casing 51, a compression mechanism 55, and a motor 56.

The casing 51 houses the compression mechanism 55 and the motor 56. The casing 51 is provided with a suction pipe 52, a discharge pipe 53, and the injection path 54. The suction pipe 52 guides the low-pressure refrigerant R1 outside the casing 51 to the compression mechanism 55. The discharge pipe 53 guides the high-pressure refrigerant R2 discharged from the compression mechanism 55 to the outside of the casing 51. The injection pipe 45 of the refrigerant circuit RC is connected to the injection path 54. The injection path 54 is a refrigerant passage configured to directly supply the intermediate-pressure refrigerant R3 having a pressure higher than the pressure of the low-pressure refrigerant R1 and lower than the pressure of the high-pressure refrigerant R2 to a compression chamber 57 of the compression mechanism 55.

The motor 56 receives electric power from the outside and generates motive power for driving the compression mechanism 55.

The compression mechanism 55 includes a compression chamber 57. The compression mechanism 55 suctions the low-pressure refrigerant R1 provided via the suction pipe 52 into the compression chamber 57. The compression mechanism 55 feeds the high-pressure refrigerant R2 generated in the compression chamber 57 to the discharge pipe 53.

(3) Configuration of Tube Assembly 60

Figure 3:
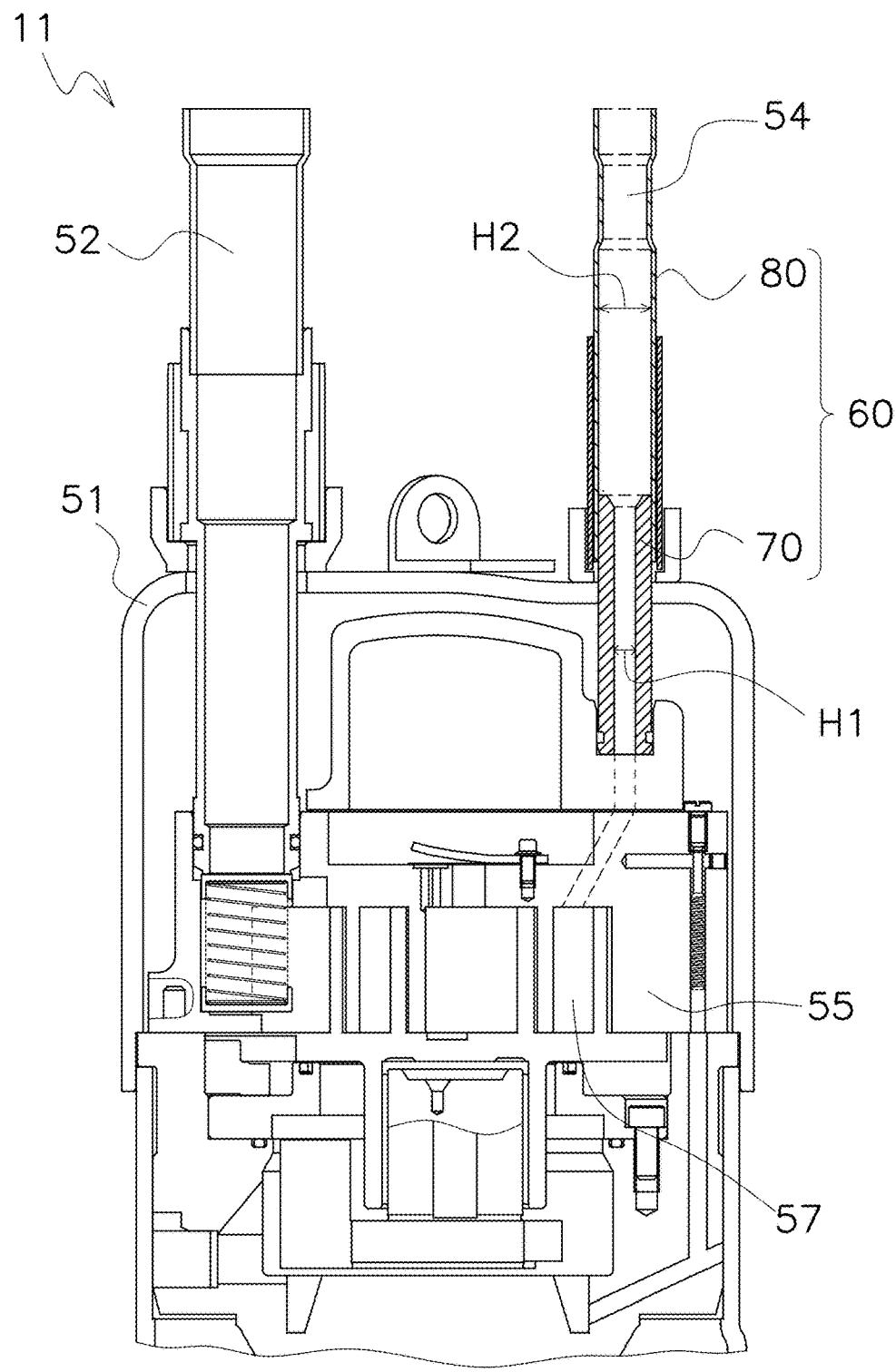
FIG. 3 is an enlarged sectional view of the compressor 11.

As shown in FIG. 3, the injection path 54 is constituted by the tube assembly 60. The tube assembly 60 includes an inner tube 70 and an outer tube 80.

The inner tube 70 is one of the components constituting the injection path 54. The inner tube 70 is made of iron, for example. The inner tube 70 has an inner diameter H1. The linear expansion coefficient of the inner tube 70 is an inner tube linear expansion coefficient $\alpha$.

The outer tube 80 is also one of the components constituting the injection path 54. The outer tube 80 is made of copper, for example. The outer tube 80 has an inner diameter H2. The inner diameter H2 is larger than the inner diameter H1. The linear expansion coefficient of the outer tube 80 is an outer tube linear expansion coefficient $\beta$. The outer tube linear expansion coefficient $\beta$ is larger than the inner tube linear expansion coefficient $\alpha$.

Figure 4:
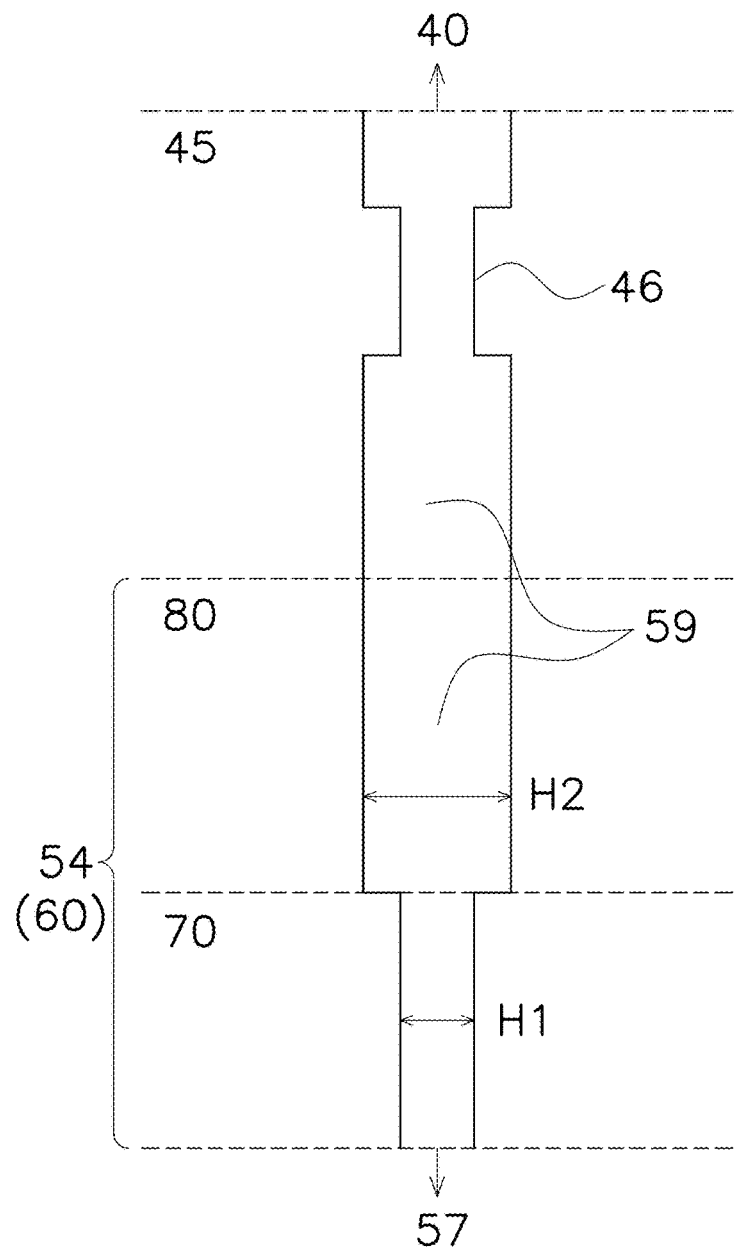
FIG. 4 is a schematic diagram for describing a muffler space 59.

As shown in FIG. 4, the injection path 54 constituted by the tube assembly 60 forms a flow path of the intermediate-pressure refrigerant R3 by being connected with the injection pipe 45. The inner tube 70 having the small inner diameter H1 constitutes one bottleneck in the flow path. Furthermore, the flow path includes the bottleneck 46 of the injection pipe 45. A section sandwiched by these two bottlenecks forms a muffler space 59. The muffler space 59 has a function of reducing noise caused by pressure pulsation of the intermediate-pressure refrigerant R3.

Figure 5:
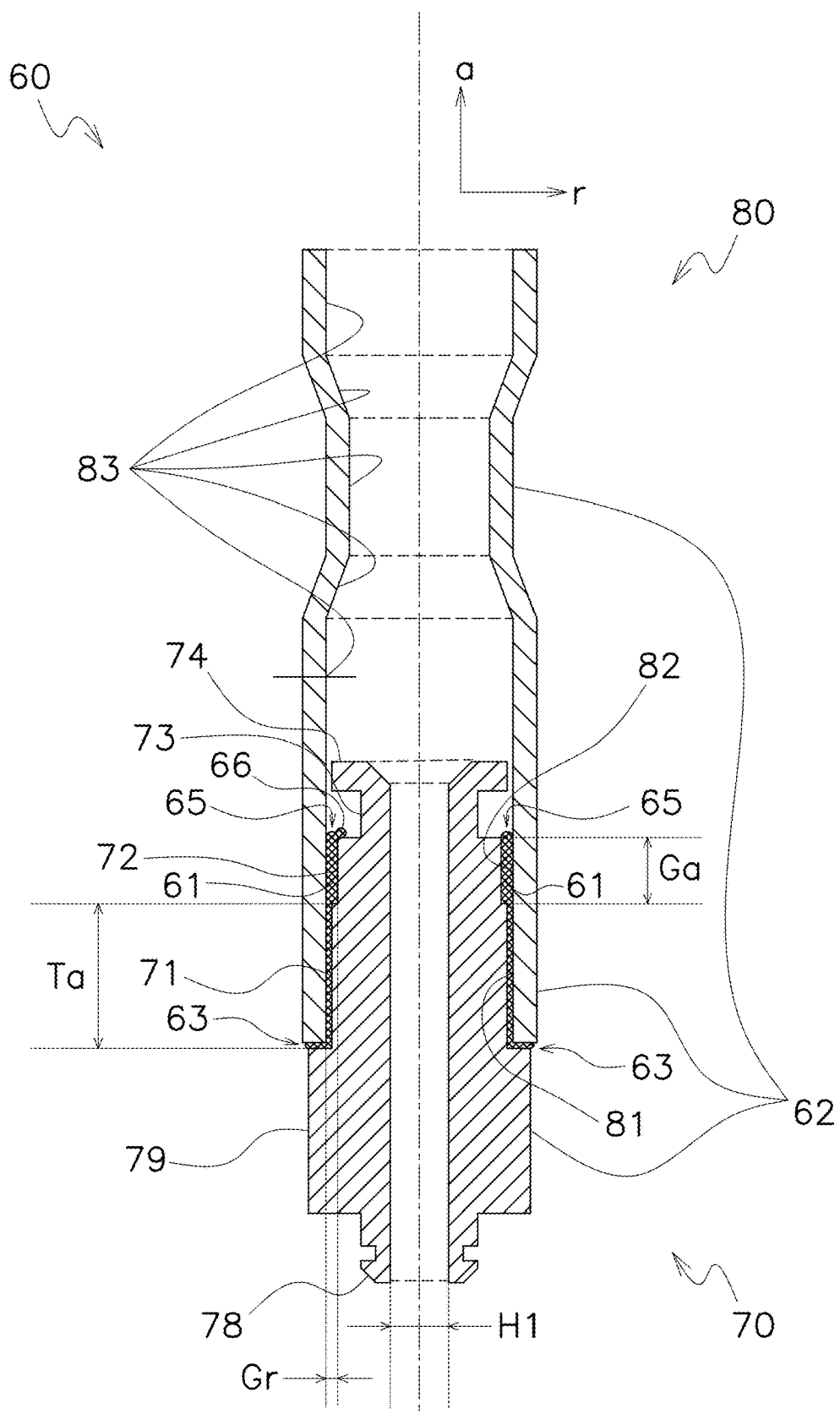
FIG. 5 is a sectional view of a tube assembly 60.

FIG. 5 shows the structure of the tube assembly 60. The inner tube 70 and the outer tube 80 share an axis 70A. The drawing shows the structure of the tube assembly 60, that is, the inner tube 70 and the outer tube 80 in a cross section passing through the axis 70A of the inner tube 70. The tube assembly 60 has a tube assembly outer peripheral surface 62. The tube assembly outer peripheral surface 62 is a portion that can be visually recognized from outside of the tube assembly 60. The tube assembly outer peripheral surface 62 includes an outer peripheral surface of the inner tube 70 and an outer peripheral surface of the outer tube 80.

The outer peripheral surface of the inner tube 70 includes an outer peripheral surface base portion 79, an outer peripheral surface first portion 71, an outer peripheral surface second portion 72, an accommodating portion 73, and a flange 74 in that order. In a tube assembly radial direction r, the outer peripheral surface base portion 79 is located on the outermost side among them. Next, the outer peripheral surface first portion 71, the outer peripheral surface second portion 72, and the accommodating portion 73 are located inward in that order. The accommodating portion 73 is located in the innermost side. The accommodating portion 73 can accommodate a surplus 66 of a brazing material 61. The accommodating portion 73 is adjacent to the outer peripheral surface second portion 72. The flange 74 bulges outward in the tube assembly radial direction r. The flange 74 is adjacent to the accommodating portion 73.

An inner peripheral surface of the outer tube 80 includes an inner peripheral surface first portion 81, an inner peripheral surface second portion 82, and an inner peripheral surface residual portion 83 in that order. The inner peripheral surface first portion 81 and the inner peripheral surface second portion 82 have the inner diameter H2. A part of the inner peripheral surface residual portion 83 has the inner diameter H2. An end surface of the outer tube 80 adjacent to the inner peripheral surface first portion 81 is in contact with an end surface of the inner tube 70 adjacent to the outer peripheral surface base portion 79, and both end surfaces constitute a connecting portion 63 between the inner tube 70 and the outer tube 80 on the tube assembly outer peripheral surface 62. The connecting portion 63 can be visually recognized from outside of the tube assembly 60.

By partially inserting the inner tube 70 into the outer tube 80, the outer peripheral surface first portion 71 comes into contact with the inner peripheral surface first portion 81, and a brazing gap 65 is formed between the outer peripheral surface second portion 72 and the inner peripheral surface second portion 82. The brazing gap 65 is a place where the brazing material 61 is disposed in a manufacturing step of the tube assembly 60. The brazing material 61 fixes the outer peripheral surface second portion 72 and the inner peripheral surface second portion 82 by melting and then fixing. A part of the brazing material 61 penetrates between the outer peripheral surface first portion 71 and the inner peripheral surface first portion 81. Therefore, the brazing material 61 at least partially fixes the outer peripheral surface first portion 71 and the inner peripheral surface first portion 81. As a result of the brazing material 61 penetrating between the outer peripheral surface first portion 71 and the inner peripheral surface first portion 81, a part of the brazing material 61 may be located at the connecting portion 63 of the tube assembly outer peripheral surface 62.

Figure 6:
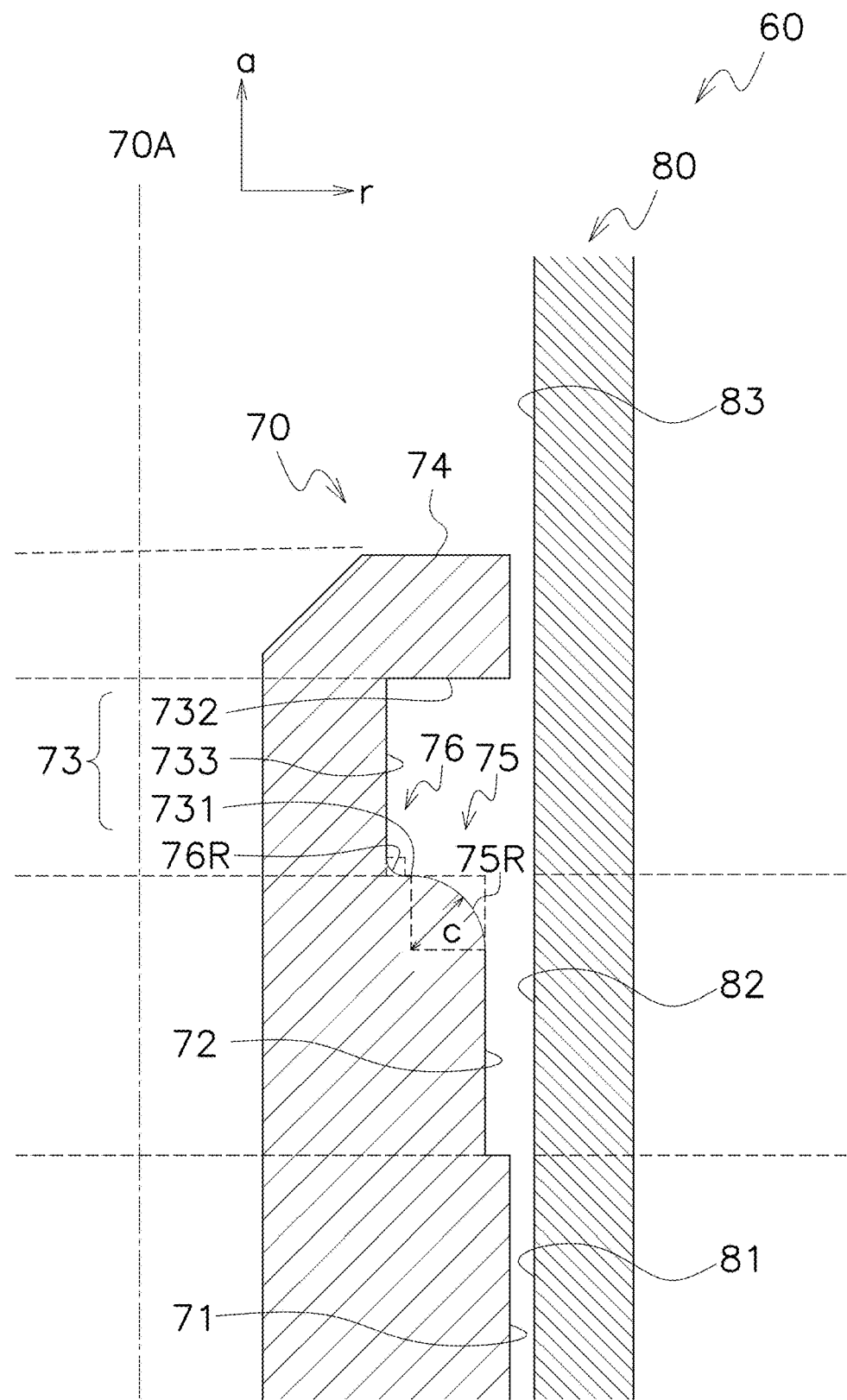
FIG. 6 is a partially enlarged view of FIG. 5.

FIG. 6 shows a periphery of the accommodating portion 73 of the tube assembly 60. However, FIG. 6 does not show the brazing material 61. The accommodating portion 73 has an accommodating portion first wall surface 731, an accommodating portion second wall surface 732, and an accommodating portion bottom surface 733. The accommodating portion first wall surface 731 is adjacent to the outer peripheral surface second portion 72. The accommodating portion second wall surface 732 is apart from the accommodating portion first wall surface 731. The accommodating portion bottom surface 733 connects the accommodating portion first wall surface 731 and the accommodating portion second wall surface 732. The inner tube 70 has a point 75 and a corner 76. The point 75 is formed by the outer peripheral surface second portion 72 and the accommodating portion first wall surface 731. The corner 76 is formed by the accommodating portion first wall surface 731 and the accommodating portion bottom surface 733.

The point 75 is provided with a curved surface 75R. The curved surface 75R forms a curve in a cross section of the inner tube 70 passing through the axis 70A of the inner tube 70. The corner 76 is provided with a curved surface 76R. The curved surface 76R forms a curve in a cross section of the inner tube 70 passing through the axis 70A of the inner tube 70.

(4) Design Parameters of Tube Assembly 60

An example of design parameters of the tube assembly 60 will be described below with reference to FIG. 5.

The inner diameter H1 of the inner tube 70 is 6.4 mm or more.

The inner diameter H2 of the outer tube 80 is 18 mm or more.

A dimension Gr of the brazing gap 65 in the tube assembly radial direction r is 50 μm or more and 450 μm or less.

A dimension Ga of the brazing gap 65 in a tube assembly axial direction a is 4 mm or more and 6 mm or less.

A length Ta of the outer peripheral surface first portion 71 in the tube assembly axial direction a is 2 mm or more and 3 mm or less.

Another example of the design parameters of the tube assembly 60 will be described with reference to FIG. 6. A curvature radius c of the curved surface 75R is 0.5 mm or more and 1.0 mm or less.

(5) Method of Manufacturing Tube Assembly 60

The tube assembly 60 is manufactured by the following procedure.

Figure 7:
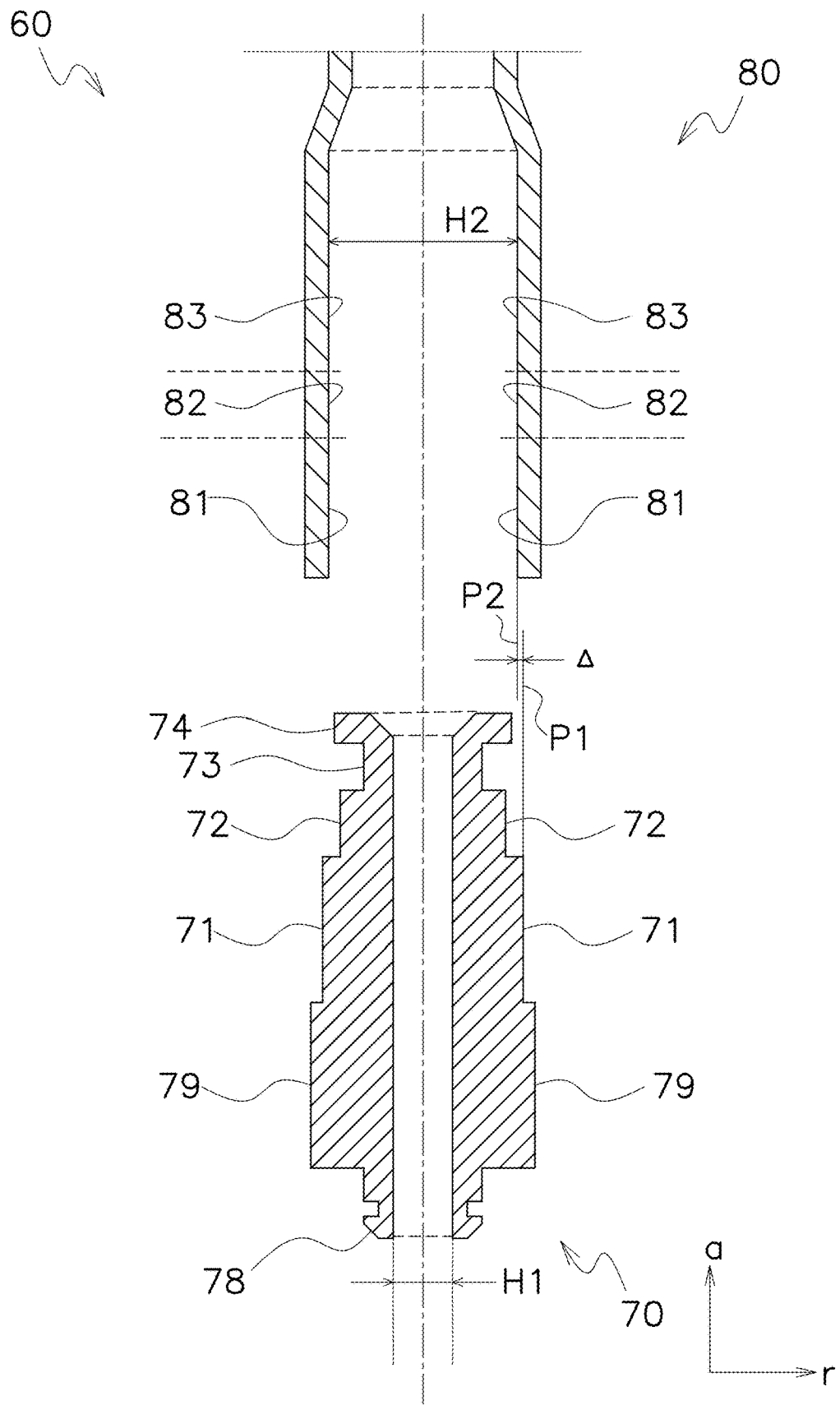
FIG. 7 is a schematic diagram illustrating a manufacturing step of the tube assembly 60.

As a first step, as shown in FIG. 7, the inner tube 70 is placed such that the outer peripheral surface first portion 71 is located below the outer peripheral surface second portion 72.

Figure 8:
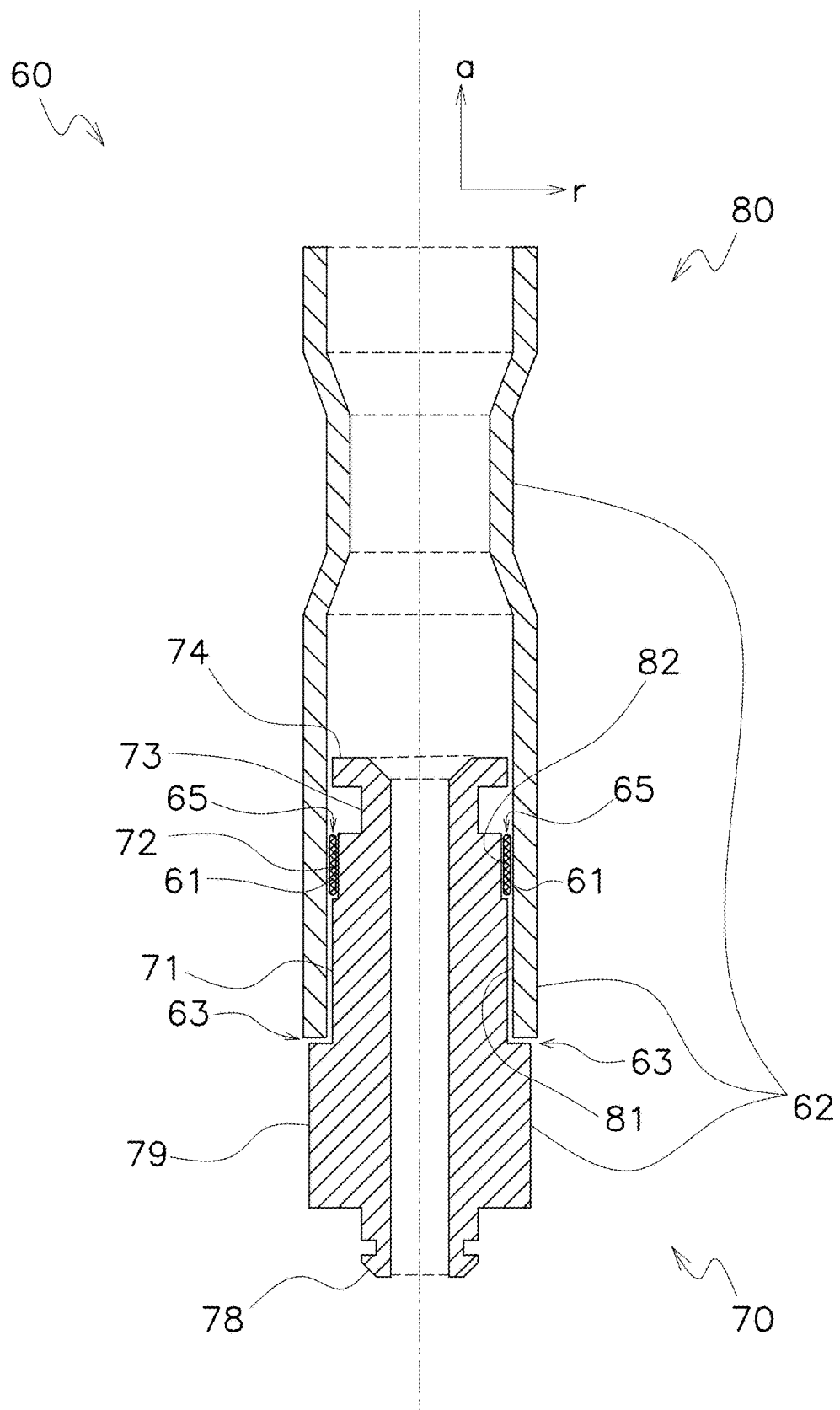
FIG. 8 is another schematic diagram illustrating the manufacturing step of the tube assembly 60.

As a second step, as shown in FIG. 8, the inner tube 70 is disposed above the outer tube 80, and preparation for inserting the inner tube 70 into the outer tube 80 by press-fitting is performed. As shown in FIG. 8, before the inner tube 70 is inserted into the outer tube 80, it is desirable that a radial position P1 of the outer peripheral surface first portion 71 is located outside a radial position P2 of the inner peripheral surface first portion 81 by $\Delta=0.25$ mm or less. This arrangement enables press fitting.

As a third step, prior to the insertion, the brazing material 61 is disposed on the outer peripheral surface second portion 72 forming the brazing gap 65. This arrangement is to position the brazing material 61 in the brazing gap 65 after insertion. Alternatively, the brazing material 61 may be disposed in the brazing gap 65 after insertion.

As a fourth step, the inner tube 70 is inserted into the outer tube 80 by press-fitting. As a result of the press-fitting, the outer peripheral surface first portion 71 comes into contact with the inner peripheral surface first portion 81, and the outer peripheral surface second portion 72 and the inner peripheral surface second portion 82 form the brazing gap 65.

As a fifth step, an aggregate of the inner tube 70, the outer tube 80, and the brazing material 61 is brazed in a furnace. As a result, as shown in FIG. 5, the melted brazing material 61 fixes the outer peripheral surface second portion 72 and the inner peripheral surface second portion 82. A part of the brazing material 61 preferably penetrates between the outer peripheral surface first portion 71 and the inner peripheral surface first portion 81. More preferably, a part of the brazing material 61 is exposed from the connecting portion 63 to the tube assembly outer peripheral surface 62.

(6) Characteristics (6-1)

Generally, when there is a large gap at the joint portion of the two metal members, there is a possibility that the positions or orientations of the two metal members are deviated with respect to each other during a step of brazing. This deviation can cause a defect in a brazed state and reduce the strength of a refrigerant flow path member. As a result, in the compressor equipped with the refrigerant flow path member and a refrigeration apparatus including the compressor, there is a possibility that an operation failure is caused by the deviation.

In the tube assembly 60, in contrast, the outer peripheral surface first portion 71 is in contact with the inner peripheral surface first portion 81. Therefore, since the inner tube 70 and the outer tube 80 hold each other, a normal shape of the brazing gap 65 can be maintained both during the manufacturing step of the tube assembly 60 and after the manufacturing of the tube assembly 60 is completed. Therefore, an overall shape and strength of the tube assembly 60 can be maintained.

(6-2)

The outer tube linear expansion coefficient $\beta$, which is the linear expansion coefficient of the outer tube 80, is larger than the inner tube linear expansion coefficient $\alpha$, which is the linear expansion coefficient of the inner tube 70. Therefore, since a part of the brazing material 61 enters a gap between the inner peripheral surface first portion 81 and the outer peripheral surface first portion 71 temporarily generated in the process of brazing at a high temperature, the strength of the tube assembly 60 is further secured.

(6-3)

A part of the brazing material 61 extends from the brazing gap 65 to the connecting portion 63 in the tube assembly axial direction a. Therefore, since the inner tube 70 and the outer tube 80 are more firmly fixed, the strength of the tube assembly 60 is further secured.

(6-4)

Before the inner tube 70 is inserted into the outer tube 80, the outer peripheral surface first portion 71 is located radially outside the inner peripheral surface first portion 81 by a predetermined dimension. Therefore, the pressure at a contact portion between the outer peripheral surface first portion 71 and the inner peripheral surface first portion 81 can be secured.

(6-5)

The inner tube 70 has the accommodating portion 73. Therefore, since the surplus 66 of the melted brazing material 61 can be accommodated in the accommodating portion 73, the entire shape of the tube assembly 60 can be maintained.

(6-6)

The point 75 is provided with a curved surface 75R. The curvature radius c of the curved surface 75R can be 0.5 mm or more and 1.0 mm or less. Such a curved surface 75R facilitates movement of the melted brazing material 61 to the brazing gap 65. The curved surface 76R provided at the corner 76 also promotes the movement of the melted brazing material 61 in some cases.

(6-7)

The inner tube 70 has the flange 74. Therefore, since the flange 74 suppresses inclination of the outer tube 80, the entire shape of the tube assembly 60 can be maintained.

(6-8)

The compressor 11 and the refrigeration apparatus 100 including the compressor 11 include the tube assembly 60 in the injection path 54. Therefore, since the shape and strength of the components constituting the injection path 54 are secured, malfunction of the compressor 11 and the refrigeration apparatus 100 can be suppressed.

(6-9)

In the manufacturing step of the tube assembly 60, the inner tube 70 is fixed to the outer tube 80 by press-fitting before brazing. Therefore, since the positional relationship between the inner tube 70 and the outer tube 80 is stabilized, the shape and strength of the tube assembly 60 are secured.

Modification of Basic Embodiment (7) Modifications

Figure 9:
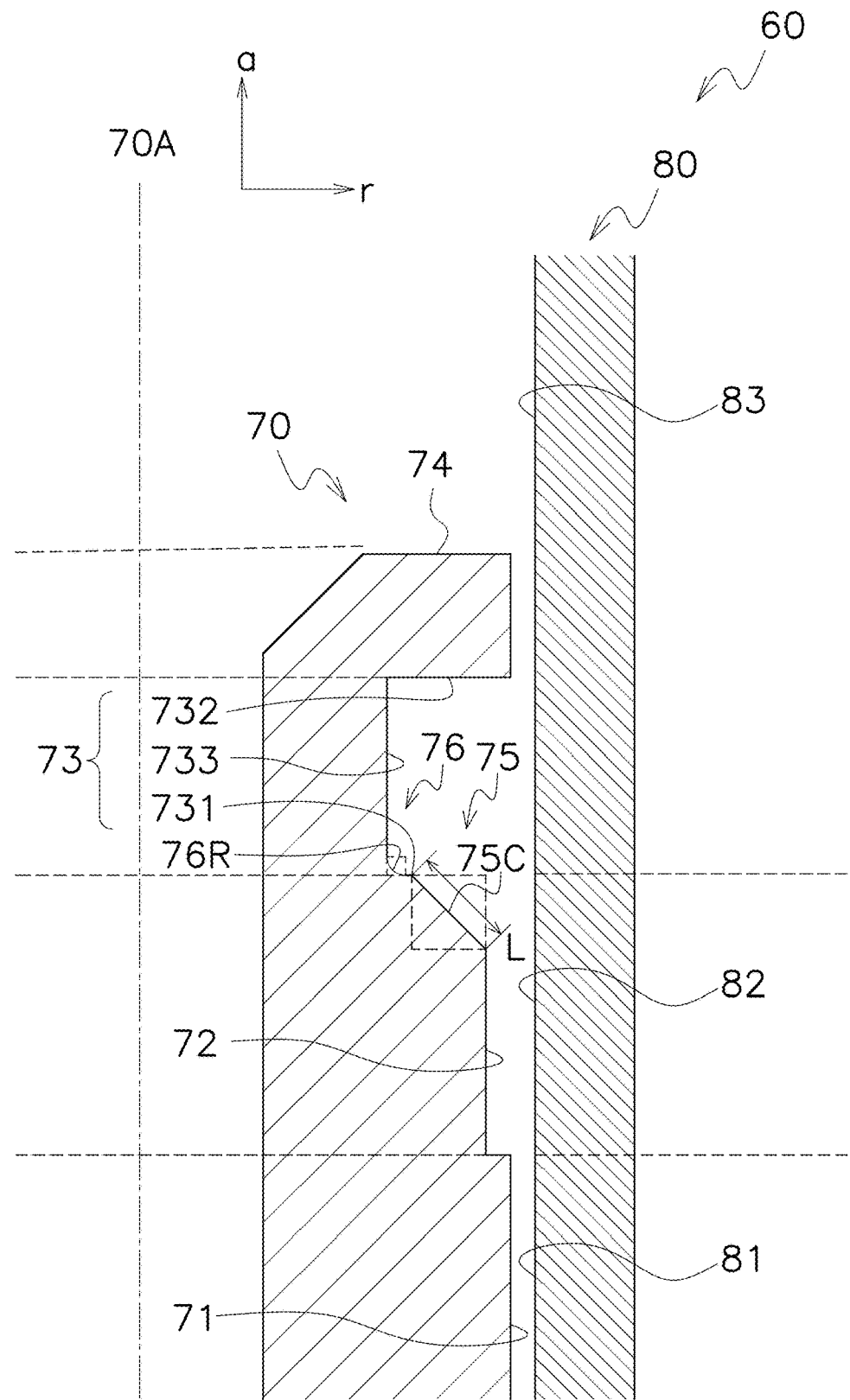
FIG. 9 is a sectional view of the tube assembly 60 according to a modification.

FIG. 9 is a structure of the tube assembly 60 according to a modification.

While the curved surface 75R is provided at the point 75 in the embodiment described above, a chamfered portion 75C is provided at the point 75 in the modification. The chamfered portion 75C forms a straight line L in the cross section of the inner tube 70 passing through the axis 70A of the inner tube 70.

A length of the straight line L formed by the chamfered portion 75C in the cross section is (0.5×√2) mm or more and (1.0×√2) mm or less.

Such a chamfered portion 75C also facilitates movement of the melted brazing material 61 to the brazing gap 65.

The embodiments of the present disclosure have been described above. It will be understood that various changes to modes and details are possible without departing from the gist and the scope of the present disclosure recited in the claims.

The invention claimed is:

1. A tube assembly comprising:
    an inner tube having an outer peripheral surface first portion and an outer peripheral surface second portion, the inner tube forming a refrigerant passage of a compressor, the outer peripheral surface second portion being located inward compared with the outer peripheral surface first portion;
    an outer tube having an inner peripheral surface first portion and an inner peripheral surface second portion, the outer tube forming the refrigerant passage, the inner peripheral surface first portion and the inner peripheral surface second portion having a same inner diameter, the inner peripheral surface first portion being located adjacent to an end of the outer tube, the inner peripheral surface second portion being located spaced from the end as compared with the inner peripheral surface first portion, and the outer peripheral surface first portion being press-fitted into the inner peripheral surface first portion; and
    a brazing material disposed in a brazing gap between the outer peripheral surface second portion and the inner peripheral surface second portion, the brazing material fixing the outer peripheral surface second portion and the inner peripheral surface second portion.

2. The tube assembly according to claim 1, wherein
    the inner tube has an inner tube linear expansion coefficient,
    the outer tube has an outer tube linear expansion coefficient larger than the inner tube linear expansion coefficient, and
    the brazing material at least partially fixes the inner peripheral surface first portion and the outer peripheral surface first portion.

3. The tube assembly according to claim 1, further comprising:
    a tube assembly outer peripheral surface,
    a part of the brazing material is located at a connecting portion between the inner tube and the outer tube on the tube assembly outer peripheral surface.

4. The tube assembly according to claim 1, wherein
    an inner diameter of the inner tube is 6.4 mm or more.

5. The tube assembly according to claim 1, wherein
    a dimension of the brazing gap in a tube assembly radial direction is 50 μm to 450 μm.

6. The tube assembly according to claim 1, wherein
    a dimension of the brazing gap in a tube assembly axial direction is 4 mm to 6 mm.

7. The tube assembly according to claim 1, wherein
    before the outer peripheral surface first portion is press-fitted into the inner peripheral surface first portion, a radial position of the outer peripheral surface first portion is located outside a radial position of the inner peripheral surface first portion by 0.25 mm or less.

8. The tube assembly according to claim 1, wherein
    a length of the outer peripheral surface first portion in a tube assembly axial direction is 2 mm to 3 mm.

9. The tube assembly according to claim 1, wherein
    the inner tube includes an accommodating portion that is adjacent to the outer peripheral surface second portion and accommodates a surplus of the brazing material.

10. The tube assembly according to claim 9, wherein
    the accommodating portion includes
        an accommodating portion first wall surface adjacent to the outer peripheral surface second portion,
        an accommodating portion second wall surface spaced from the accommodating portion first wall surface, and
        an accommodating portion bottom surface that connects the accommodating portion first wall surface and the accommodating portion second wall surface,
    the inner tube includes
        a point formed by the outer peripheral surface second portion and the accommodating portion first wall surface, and
        a corner formed by the accommodating portion first wall surface and the accommodating portion bottom surface, and the point is provided with
- a curved surface that forms a curve in a cross section of the inner tube passing through an axis of the inner tube, or
- a chamfered portion that forms a straight line in the cross section.

11. The tube assembly according to claim 10, wherein the point is provided with the curved surface, and
a curvature radius of the curved surface is 0.5 mm to 1.0 mm.

12. The tube assembly according to claim 10, wherein the point is provided with the chamfered portion, and
a length of the straight line formed by the chamfered portion in the cross section is $(0.5 \times \sqrt{2})$ mm to $(1.0 \times \sqrt{2})$ mm.

13. The tube assembly according to claim 10, wherein the corner is provided with a curved surface that forms a curve in the cross section of the inner tube passing through the axis of the inner tube.

14. The tube assembly according to claim 9, wherein the inner tube includes a flange that is adjacent to the accommodating portion and bulges outward in the tube assembly radial direction.

15. A compressor including the tube assembly according to claim 1, the compressor further comprising:
- a casing;
- a compression mechanism accommodated in the casing;
- a suction pipe that guides a low-pressure refrigerant outside the casing to the compression mechanism;
- a discharge pipe that guides a high-pressure refrigerant discharged from the compression mechanism to outside of the casing; and
- an injection path that is formed by the tube assembly and supplies a refrigerant to the compression mechanism from outside of the casing.

16. A refrigeration apparatus including the compressor according to claim 15, the refrigeration apparatus further comprising:
- a decompressor;
- a heat exchanger; and
- an injection pipe that guides a refrigerant decompressed by the decompressor to the injection path,
- the injection pipe including a bottleneck, and a muffler space defined by the bottleneck and the inner tube.

17. A method of manufacturing a tube assembly comprising:
- placing an inner tube that includes an outer peripheral surface first portion and an outer peripheral surface second portion and constitutes an injection path of a compressor such that the outer peripheral surface first portion is located below the outer peripheral surface second portion, the outer peripheral surface second portion being located inward compared with the outer peripheral surface first portion;
- preparing an outer tube that includes an inner peripheral surface first portion and an inner peripheral surface second portion and constitutes the injection path, the inner peripheral surface first portion and the inner peripheral surface second portion having a same inner diameter, the inner peripheral surface first portion being located at a side of an end of the outer tube, the inner peripheral surface second portion being located farther from the end than the inner peripheral surface first portion is;
- press-fitting the outer peripheral surface first portion into the inner peripheral surface first portion such that the outer peripheral surface second portion and the inner peripheral surface second portion form a brazing gap;
- arranging a brazing material before the press-fitting or after the press-fitting such that the brazing material is located in the brazing gap; and
- brazing the inner tube, the outer tube, and the brazing material in a furnace such that the brazing material melted by the brazing fixes the outer peripheral surface second portion and the inner peripheral surface second portion.

18. A tube assembly comprising:
- an inner tube having an outer peripheral surface first portion and an outer peripheral surface second portion, the inner tube forming a refrigerant passage of a compressor;
- an outer tube having an inner peripheral surface first portion and an inner peripheral surface second portion, the outer tube forming the refrigerant passage, the inner peripheral surface first portion being located adjacent to an end of the outer tube, the inner peripheral surface second portion being located spaced from the end as compared with the inner peripheral surface first portion, and an entirety of a circumference of the outer peripheral surface first portion being press-fitted into the inner peripheral surface first portion; and
- a brazing material disposed in a brazing gap between the outer peripheral surface second portion and the inner peripheral surface second portion, the brazing material fixing the outer peripheral surface second portion and the inner peripheral surface second portion.

* * * * *